United States Patent
Chatani et al.

(10) Patent No.: US 9,762,631 B2
(45) Date of Patent: Sep. 12, 2017

(54) MANAGING PARTICIPANTS IN AN ONLINE SESSION

(71) Applicant: Sony Interactive Entertainment America LLC, San Mateo, CA (US)

(72) Inventors: Masayuki Chatani, Foster City, CA (US); Glen Van Datta, Blaine, WA (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 0 days.

(21) Appl. No.: 14/283,959

(22) Filed: May 21, 2014

(65) Prior Publication Data

US 2014/0256449 A1    Sep. 11, 2014

Related U.S. Application Data

(63) Continuation of application No. 12/840,977, filed on Jul. 21, 2010, now Pat. No. 8,793,315, which is a
(Continued)

(51) Int. Cl.
*H04L 29/06* (2006.01)
*A63F 13/35* (2014.01)
(Continued)

(52) U.S. Cl.
CPC ............ *H04L 65/403* (2013.01); *A63F 13/35* (2014.09); *A63F 13/45* (2014.09); *H04L 67/104* (2013.01);
(Continued)

(58) Field of Classification Search
CPC ... H04L 67/104; H04L 67/24; H04L 67/1048; H04L 67/14
(Continued)

(56) References Cited

U.S. PATENT DOCUMENTS 5,630,757 A    5/1997    Gagin et al.
5,634,129 A    5/1997    Dickinson
(Continued)

FOREIGN PATENT DOCUMENTS

CN    104069637 A    10/2014
EP    1125617    8/2001
(Continued)

OTHER PUBLICATIONS

U.S. Appl. No. 13/918,809 Office Action mailed Apr. 29, 2015.
(Continued)

*Primary Examiner* — Douglas Blair
(74) *Attorney, Agent, or Firm* — Polsinelli LLP

(57) ABSTRACT

The present invention relates to an application that is configured to be operated in a multi-participant environment on a computer network. The application manages participants in an online session of a multi-user application so that if one of the participants exits the session, the session can continue without interruption. The application initiates an online session of the multi-user application, wherein the online session includes two or more participants comprised of network computers that are communicatively linked to a computer network. If the application detects that a first participant has disconnected from the online session, wherein the first participant is responsible for managing certain managerial functionality associated with the running of the multi-user application, then the application broadcasts a notification to existing participants of the online session over the communication network, thereby notifying the existing participants that the first participant has disconnected from the online session. The initiating application then re-assigns the functionality associated with the first participant to an existing participant of the online session. The participants can be communicating in a peer-to-peer
(Continued)

arrangement or can be performing server duties in a client-server arrangement.

18 Claims, 11 Drawing Sheets

Related U.S. Application Data continuation of application No. 11/375,526, filed on Mar. 13, 2006, now Pat. No. 7,792,902, which is a continuation of application No. 10/211,128, filed on Jul. 31, 2002, now abandoned.

(60) Provisional application No. 60/381,736, filed on May 17, 2002.

(51) Int. Cl.
| | |
|---|---|
| *A63F 13/45* | (2014.01) |
| *H04L 29/08* | (2006.01) |
| *A63F 13/34* | (2014.01) |
| *A63F 13/335* | (2014.01) |
| *H04L 12/18* | (2006.01) |

(52) U.S. Cl.
CPC ...... *H04L 67/1048* (2013.01); *H04L 67/1051* (2013.01); *H04L 67/14* (2013.01); *H04L 67/24* (2013.01); *H04L 67/38* (2013.01); *H04L 69/329* (2013.01); *A63F 13/335* (2014.09); *A63F 13/34* (2014.09); *A63F 2300/408* (2013.01); *A63F 2300/50* (2013.01); *A63F 2300/535* (2013.01); *A63F 2300/556* (2013.01); *A63F 2300/5533* (2013.01); *A63F 2300/5546* (2013.01); *H04L 12/185* (2013.01)

(58) Field of Classification Search
USPC .................................................. 709/227, 205
See application file for complete search history.

(56) References Cited

U.S. PATENT DOCUMENTS

| | | | |
|---|---|---|---|
| 5,682,139 A | 10/1997 | Pradeep | |
| 5,704,032 A | 12/1997 | Badovinatz et al. | |
| 5,823,879 A | 10/1998 | Goldberg | |
| 5,826,085 A | 10/1998 | Bennett | |
| 5,838,909 A | 11/1998 | Roy et al. | |
| 5,841,980 A | 11/1998 | Waters et al. | |
| 5,893,106 A | 4/1999 | Brobst et al. | |
| 5,941,947 A | 8/1999 | Brown | |
| 5,956,485 A | 9/1999 | Perlman | |
| 5,984,787 A | 11/1999 | Redpath | |
| 5,987,376 A | 11/1999 | Olson et al. | |
| 6,041,312 A | 3/2000 | Bickerton et al. | |
| 6,050,898 A | 4/2000 | Vange | |
| 6,098,091 A * | 8/2000 | Kisor ............................ 709/202 |
| 6,106,569 A | 8/2000 | Bohrer | |
| 6,108,569 A | 8/2000 | Shen | |
| 6,142,472 A | 11/2000 | Kliebisch | |
| 6,151,632 A | 11/2000 | Chaddha et al. | |
| 6,152,824 A | 11/2000 | Rothschild et al. | |
| 6,154,782 A | 11/2000 | Kawaguchi et al. | |
| 6,203,433 B1 | 3/2001 | Kume | |
| 6,219,045 B1 | 4/2001 | Leahy et al. | |
| 6,247,017 B1 | 6/2001 | Martin | |
| 6,311,209 B1 | 10/2001 | Olson et al. | |
| 6,345,297 B1 | 2/2002 | Grimm | |
| 6,352,479 B1 | 3/2002 | Sparks | |
| 6,363,416 B1 * | 3/2002 | Naeimi et al. ............... 709/209 |
| 6,446,113 B1 * | 9/2002 | Ozzie ............... G06F 17/30168 |
| | | | 707/E17.032 |
| 6,470,022 B1 * | 10/2002 | Rochberger ................. 370/437 |
| 6,487,583 B1 | 11/2002 | Harvey | |

| | | | |
|---|---|---|---|
| 6,487,678 B1 | 11/2002 | Briskey et al. | |
| 6,519,629 B2 | 2/2003 | Harvey | |
| 6,530,840 B1 | 3/2003 | Cuomo | |
| 6,539,494 B1 | 3/2003 | Abramson et al. | |
| 6,549,946 B1 | 4/2003 | Fisher | |
| 6,560,636 B2 * | 5/2003 | Cohen et al. ................. 709/203 |
| 6,561,811 B2 | 5/2003 | Rapoza et al. | |
| 6,577,628 B1 | 6/2003 | Hejza | |
| 6,587,874 B1 | 7/2003 | Golla | |
| 6,607,444 B2 | 8/2003 | Takahashi et al. | |
| 6,631,412 B1 | 10/2003 | Glasser et al. | |
| 6,654,831 B1 | 11/2003 | Otterness et al. | |
| 6,676,521 B1 | 1/2004 | La Mura et al. | |
| 6,704,885 B1 | 3/2004 | Salas-Meza et al. | |
| 6,748,420 B1 | 6/2004 | Quatrano et al. | |
| 6,761,636 B2 * | 7/2004 | Chung et al. .................... 463/42 |
| 6,763,371 B1 | 7/2004 | Jandel | |
| 6,769,990 B2 | 8/2004 | Cohen | |
| 6,799,255 B1 | 9/2004 | Blumenau | |
| 6,839,435 B1 | 1/2005 | Lijima et al. | |
| 6,844,893 B1 | 1/2005 | Miller et al. | |
| 6,931,446 B1 | 8/2005 | Cox et al. | |
| 7,003,550 B1 | 2/2006 | Cleasby et al. | |
| 7,016,942 B1 | 3/2006 | Odom | |
| 7,018,295 B2 | 3/2006 | Sakaguchi et al. | |
| 7,025,675 B2 | 4/2006 | Fogel | |
| 7,035,919 B1 | 4/2006 | Lee et al. | |
| 7,056,217 B1 | 6/2006 | Pelkey et al. | |
| 7,089,301 B1 | 8/2006 | Labio et al. | |
| 7,107,312 B2 | 9/2006 | Hackbarth et al. | |
| 7,165,107 B2 | 1/2007 | Pouyoul et al. | |
| 7,177,950 B2 | 2/2007 | Narayan et al. | |
| 7,188,145 B2 | 3/2007 | Lowery et al. | |
| 7,203,755 B2 | 4/2007 | Zhu et al. | |
| 7,290,264 B1 | 10/2007 | Powers et al. | |
| 7,366,185 B2 | 4/2008 | Bush | |
| 7,454,458 B2 | 11/2008 | Islam et al. | |
| 7,523,163 B2 | 4/2009 | Zhu et al. | |
| 7,539,216 B2 | 5/2009 | Johns et al. | |
| 7,587,465 B1 | 9/2009 | Muchow | |
| 7,613,800 B2 | 11/2009 | Dhupelia | |
| 7,640,298 B2 | 12/2009 | Berg | |
| 7,680,908 B2 | 3/2010 | Gates, III et al. | |
| 7,711,847 B2 | 5/2010 | Dhupelia | |
| 7,720,908 B1 | 5/2010 | Newson et al. | |
| 7,730,206 B2 | 6/2010 | Newson et al. | |
| 7,792,902 B2 | 9/2010 | Chatani | |
| 7,822,809 B2 | 10/2010 | Dhupelia | |
| 7,831,666 B2 | 11/2010 | Chatani et al. | |
| 7,877,509 B2 | 1/2011 | Dhupelia | |
| 7,908,393 B2 | 3/2011 | Marr et al. | |
| 7,930,345 B2 | 4/2011 | Dhupelia | |
| 7,962,549 B2 | 6/2011 | Dhupelia | |
| 8,051,180 B2 | 11/2011 | Mazzaferri et al. | |
| 8,131,802 B2 | 3/2012 | Jacob | |
| 8,335,813 B2 | 12/2012 | Sun et al. | |
| 8,402,124 B1 | 3/2013 | Barillaud et al. | |
| 8,554,842 B2 | 10/2013 | Maehiro | |
| 8,560,707 B2 | 10/2013 | Jacob | |
| 8,719,375 B2 | 5/2014 | Hildreth et al. | |
| 8,725,874 B2 | 5/2014 | Keohane et al. | |
| 8,856,233 B2 | 10/2014 | Lacapra et al. | |
| 8,972,548 B2 | 3/2015 | Jacob | |
| 9,032,248 B1 | 5/2015 | Petty et al. | |
| 9,369,540 B2 * | 6/2016 | Lowery ............... G06F 17/3087 |
| 9,516,068 B2 | 12/2016 | Jacob | |
| 2001/0009868 A1 | 7/2001 | Sakaguchi et al. | |
| 2001/0024974 A1 | 9/2001 | Cohen | |
| 2001/0037466 A1 | 11/2001 | Fukutake et al. | |
| 2001/0044339 A1 | 11/2001 | Cordero et al. | |
| 2002/0023117 A1 * | 2/2002 | Bernardin et al. ............ 709/104 |
| 2002/0035604 A1 | 3/2002 | Cohen et al. | |
| 2002/0042830 A1 | 4/2002 | Bose et al. | |
| 2002/0049086 A1 | 4/2002 | Otsu | |
| 2002/0062348 A1 | 5/2002 | Maehiro | |
| 2002/0075844 A1 | 6/2002 | Hagen | |
| 2002/0082077 A1 | 6/2002 | Johnson | |
| 2002/0107934 A1 * | 8/2002 | Lowery et al. ................. 709/213 |
| 2002/0107935 A1 * | 8/2002 | Lowery et al. ................. 709/216 |

(56) References Cited

U.S. PATENT DOCUMENTS

| | | |
|---|---|---|
| 2002/0115488 A1 | 8/2002 | Berry |
| 2002/0133707 A1 | 9/2002 | Newcombe |
| 2002/0142842 A1 | 10/2002 | Easley et al. |
| 2002/0156917 A1* | 10/2002 | Nye ............................. 709/238 |
| 2002/0169889 A1 | 11/2002 | Yang et al. |
| 2002/0178260 A1* | 11/2002 | Chang ................... G06Q 40/04 709/225 |
| 2002/0184070 A1* | 12/2002 | Chen et al. ........................ 705/9 |
| 2003/0018719 A1 | 1/2003 | Ruths et al. |
| 2003/0073494 A1 | 4/2003 | Kalpakian et al. |
| 2003/0126245 A1* | 7/2003 | Feltin et al. .................. 709/223 |
| 2003/0167343 A1 | 9/2003 | Furuno |
| 2003/0190960 A1 | 10/2003 | Jokipii |
| 2003/0204566 A1 | 10/2003 | Dhupelia |
| 2003/0204593 A1 | 10/2003 | Brown et al. |
| 2003/0217135 A1 | 11/2003 | Chatani |
| 2003/0217158 A1 | 11/2003 | van Datta |
| 2004/0001476 A1 | 1/2004 | Islam et al. |
| 2004/0024879 A1 | 2/2004 | Dingman |
| 2004/0030787 A1 | 2/2004 | Jandel |
| 2004/0031052 A1 | 2/2004 | Wannamaker et al. |
| 2004/0053690 A1 | 3/2004 | Fogel |
| 2004/0059711 A1 | 3/2004 | Jandel |
| 2004/0117443 A1 | 6/2004 | Barsness |
| 2004/0139228 A1 | 7/2004 | Takeda |
| 2005/0038836 A1 | 2/2005 | Wang |
| 2005/0068894 A1 | 3/2005 | Yu et al. |
| 2005/0105526 A1 | 5/2005 | Stiemerling |
| 2005/0144521 A1 | 6/2005 | Werner |
| 2005/0245317 A1 | 11/2005 | Arthur et al. |
| 2005/0251577 A1 | 11/2005 | Guo |
| 2005/0259637 A1 | 11/2005 | Chu |
| 2005/0262411 A1 | 11/2005 | Vertes |
| 2006/0015560 A1 | 1/2006 | MacAuley et al. |
| 2006/0047836 A1 | 3/2006 | Rao et al. |
| 2006/0069752 A1 | 3/2006 | Chatani |
| 2006/0075127 A1 | 4/2006 | Juncker |
| 2006/0085792 A1 | 4/2006 | Traut |
| 2006/0100020 A1 | 5/2006 | Kasai |
| 2006/0164974 A1 | 7/2006 | Ramalho et al. |
| 2006/0168107 A1 | 7/2006 | Balan et al. |
| 2006/0190540 A1 | 8/2006 | Chatani |
| 2006/0200551 A1 | 9/2006 | Bali et al. |
| 2006/0218274 A1 | 9/2006 | Labio et al. |
| 2006/0218275 A1 | 9/2006 | Labio et al. |
| 2006/0247011 A1 | 11/2006 | Gagner |
| 2006/0248144 A1 | 11/2006 | Zhu et al. |
| 2006/0253595 A1 | 11/2006 | van Datta |
| 2006/0258463 A1 | 11/2006 | Cugno et al. |
| 2006/0288103 A1 | 12/2006 | Gobara |
| 2007/0058792 A1 | 3/2007 | Chaudhari |
| 2007/0061460 A1 | 3/2007 | Khan |
| 2007/0076729 A1 | 4/2007 | Takeda |
| 2007/0094325 A1 | 4/2007 | Ih et al. |
| 2007/0165629 A1 | 7/2007 | Chaturvedi |
| 2007/0174399 A1 | 7/2007 | Ogle et al. |
| 2007/0191109 A1 | 8/2007 | Crowder |
| 2007/0208748 A1 | 9/2007 | Li |
| 2007/0217436 A1 | 9/2007 | Markley |
| 2007/0233865 A1 | 10/2007 | Garbow et al. |
| 2007/0288598 A1 | 12/2007 | Edeker et al. |
| 2007/0291706 A1 | 12/2007 | Miller et al. |
| 2008/0049755 A1 | 2/2008 | Gannon et al. |
| 2008/0189365 A1 | 8/2008 | Narayanaswami et al. |
| 2008/0243953 A1 | 10/2008 | Wu et al. |
| 2008/0280686 A1 | 11/2008 | Dhupelia et al. |
| 2008/0291839 A1 | 11/2008 | Hooper et al. |
| 2009/0006545 A1 | 1/2009 | Dhupelia |
| 2009/0006604 A1 | 1/2009 | Dhupelia |
| 2009/0077245 A1 | 3/2009 | Smelyansky |
| 2009/0089363 A1 | 4/2009 | Keohane et al. |
| 2009/0094370 A1 | 4/2009 | Jacob |
| 2009/0113060 A1 | 4/2009 | Jacob |
| 2009/0138610 A1 | 5/2009 | Gobara |
| 2009/0157882 A1 | 6/2009 | Kashyap |
| 2009/0240821 A1 | 9/2009 | Juncker |
| 2009/0287828 A1 | 11/2009 | Wei et al. |
| 2010/0153496 A1 | 6/2010 | Heinla |
| 2010/0279767 A1 | 11/2010 | Dhupelia |
| 2010/0285872 A1 | 11/2010 | Dhupelia |
| 2010/0287239 A1 | 11/2010 | Chatani |
| 2012/0166651 A1 | 6/2012 | Jacob |
| 2013/0304931 A1 | 11/2013 | Jacob |
| 2015/0180958 A1 | 6/2015 | Jacob |

FOREIGN PATENT DOCUMENTS

| | | |
|---|---|---|
| EP | 1499987 | 1/2005 |
| EP | 2360874 | 8/2011 |
| EP | 2360875 | 8/2011 |
| GB | 2325543 A | 11/1998 |
| IN | 269863 | 12/2015 |
| JP | 05-022346 | 1/1993 |
| JP | 63-32725 | 9/1998 |
| JP | 11-234326 | 8/1999 |
| JP | 2000-124939 | 4/2000 |
| JP | 2000-157724 | 6/2000 |
| JP | 2001-187273 | 7/2001 |
| JP | 2001-314657 | 11/2001 |
| JP | 2002-011251 | 1/2002 |
| JP | 2003-099337 | 4/2003 |
| TW | 201347493 | 11/2013 |
| TW | I491229 | 7/2015 |
| WO | WO 00/05854 | 2/2000 |
| WO | WO 00/10099 | 2/2000 |
| WO | WO 00/68864 | 11/2000 |
| WO | WO 01/63423 | 8/2001 |
| WO | WO 01/82678 | 11/2001 |
| WO | WO 02/35769 | 5/2002 |
| WO | WO 03/091894 | 11/2003 |
| WO | WO 03/100643 | 12/2003 |
| WO | WO 2004/063843 | 7/2004 |
| WO | WO 2005/088466 | 9/2005 |
| WO | WO 2006/023508 | 3/2006 |
| WO | WO 2009/045475 | 4/2009 |

OTHER PUBLICATIONS

"Brief for Appellee," in re Masayuki Chatani et al., U.S. Court of Appeals for the Federal Circuit (2007-1150) (May 21, 2007).

"Brief of Appellants," in re Masayuki Chatani et al., U.S. Court of Appeals for the Federal Circui (2007-1150) (Mar. 23, 2007).

"In Re Masayuki Chatani and Glen Van Datta," United States Court of Appeals for the Federal Circuit, 2007-1150 (U.S. Appl. No. 11/211,128), Nov. 19, 2007.

"Petition for Panel Rehearing," In Re Masayuki Chatani and Glen Van Datta, Appeal From the United States Patent and Trademark Office, Board of Patent Appeals and Interferences, in the United States Court of Appeals for the Federal Circuit, 2007-1150 (U.S. Appl. No. 10/211,128), Jan. 3, 2008.

"Reply Brief of Appellants," In re Masayuki Chatani et al., U.S. Court of Appeals for the Federal Circuit (2007-1150) (Jun. 4, 2007).

"Technical Issues of establishing any-to-any 2-way real-time communications over the internet," Apr. 24, 2005, URL http://web.archive.org/web/20050424081036/.

Aronson, Jesse. "Using Groupings for Networked Gaming," Gamasutra.com, Jun. 21, 2000.

Audet, F. Nat Behavioral Requirements for Unicast UDP, BEHAVE Internet-Draft, Jul. 15, 2005.

Boulic, Ronan etl al. "Integration of Motion Control Techniques for Virtual Human and Avatar Real-Time Animation," Swiss Fedl Inst. of Tech., Lausanne, Switzerland, Sep. 1997.

Chiueh, Tzi-cker, "Distributed Systems Support for Networked Games," Computer Science Department, State University of New York at Stony Brook, Stony Brook, NY, May 1997.

Cisco Systems Inc., "Network Flow Management: Resource Reservation for Multimedia Flows," Mar. 19, 1999.

Diot et al., "A Distributed Architecture for Multiplayer Interactive Applications on the Internet", Aug. 1999, Network, IEEE, vol. 13, Issue 4, Jul.-Aug. 1999, pp. 6-15.

(56) References Cited

OTHER PUBLICATIONS

ECC Report 50. "Technical Issues of Establishing Any-to-Any-2-Way Real-Time Communications over the Internet." Electronic Communications Committee (ECC). Gothenburg, Jul. 2004.
Festa and Borland, "Netscape alumni to launch P2P company", Aug. 2, 2001, (avaiable at http://news.cnet.com/news/0-1005-202-6766377.html).
Hagsand O: Interactive Multiuser Ves in the DIVE System: IEEE Multimedia, IEEE Service Center, New York, NY, US vol. 3, No. 1, 21 Mar. 21, 1996, pp. 30-39, XP000582951 ISSN: 1070-986X.
Hanada, S. "The Design of Network Game and DirectPlay," Inside Windows, Softbank K.K., vol. 4, pp. 42-57, Apr. 1, 1998.
Rosenberg, J. Interactive Connectivity Establishment (ICE): A Methodology for Network Address Translator (NAT) Traversal for Multimedia Session Establishment Protocols, Mmusic Internet-Draft, Jul. 19, 2004.
Rosenberg, J. Interactive Connectivity Establishment (ICE): A Methodology for Network Address Translator (NAT) Traversal for Offer/Answer Protocols, Mmusic Internet-Draft, Jul. 17, 2005.
Rosenberg, J. Interactive Connectivity Establishment (ICE): A Methodology for Network Address Translator (NAT) Traversal for Multimedia Session Establishment Protocols, Mmusic Internet-Draft, Oct. 25, 2004.
Rosenberg, J. Interactive Connectivity Establishment (ICE): A Methodology for Network Address Translator (NAT) Traversal for Off/Answer Protocols, Mmusic Internet-Draft, Jan. 16, 2007.
Rosenberg, J. "Simple Traversal of UDP Through Network Address Translators (NAT)," BEHAVE Internet-Draft, Jul. 17, 2005.
Rosenberg, J. STUN—Simple Traversal of User Datagram Protocols (UDP) Throught Network Address Translators (NATs), Network Working Group, Mar. 2003.
Rosenberg, J. Traversal using Relay NAT (TURN), MIDCOM Internet-Draft, Oct. 20, 2003.
Takeda, Y. Symmetric NAT Traversal Using STUN, Internet Engineering Task Force, Jun. 2003.
PCT/US03/08682 International Search Report mailed Oct. 14, 2003.
PCT/US03/12668 International Search Report mailed Jul. 17, 2003.
PCT/US08/11415 Search Report and Written Opinion mailed Dec. 5, 2008.
EP 03 721 1413, European Search Report dated Jun. 30, 2005.
Chinese Application No. 03801033, Office Action mailed Jun. 9, 2006.
Chinese Application No. 03801033, Office Action mailed Jul. 5, 2011.
Chinese Application No. 03801033, Office Action mailed Sep. 25, 2009.
European Application No. 03724201.3, Office Action mailed Dec. 13, 2013.
European Application No. 03724201.3, Office Action mailed Jul. 3, 2012.
Chinese Application No. 200810168739.8, Decision of Rejection dated Dec. 11, 2012.
Chinese Application No. 200810168739.8, Office Action dated May 11, 2012.
Chinese Application No. 200810168739.8, Office Action dated May 19, 2011.
Chinese Application No. 20088011547.1, Decision of Rejection dated Jul. 5, 2013.
Chinese Application No. 20088011547.1, Office Action dated Oct. 12, 2012.
Chinese Application No. 20088011547.1, Office Action dated Mar. 7, 2012.
Chinese Application No. 20088011547.1, Office Action dated Aug. 10, 2012.
EP 08014892.7 Office Action mailed Jul. 20, 2011.
Taiwan Application No. 097138349, Office Action dated Mar. 26, 2014.
Taiwan Application No. 097138349, Office Action dated Feb. 8, 2013.
EP 08835745.4 Extended European Search Report dated Jul. 22, 2011.
EP 11004182.9 Extended European Search Report dated Jul. 14, 2011.
EP 11004181.1 Extended European Search Report dated Jul. 22, 2011.
U.S. Appl. No. 10/211,128 Final Office Action mailed Feb. 2, 2004.
U.S. Appl. No. 10/211,128 Office Action mailed Nov. 10, 2003.
U.S. Appl. No. 11/375,526 Office Action mailed Apr. 8, 2008.
U.S. Appl. No. 11/375,526 Final Office Action mailed Jul. 3, 2007.
U.S. Appl. No. 11/375,526 Final Office Action mailed Mar. 2, 2007.
U.S. Appl. No. 11/375,526 Office Action mailed Oct. 24, 2006.
U.S. Appl. No. 11/403,623 Office Action mailed Jun. 25, 2009.
U.S. Appl. No. 11/403,623 Office Action mailed Apr. 9, 2008.
U.S. Appl. No. 11/403,623 Final Office Action mailed Jul. 3, 2007.
U.S. Appl. No. 11/403,623 Final Office Action mailed Mar. 5, 2007.
U.S. Appl. No. 11/403,623 Office Action mailed Oct. 24, 2006.
U.S. Appl. No. 12/840,977 Office Action mailed Jul. 30, 2013.
U.S. Appl. No. 12/840,977 Final Office Action mailed Jun. 18, 2012.
U.S. Appl. No. 12/840,977 Final Office Action mailed Oct. 19, 2011.
U.S. Appl. No. 12/840,977 Office Action mailed May 16, 2011.
U.S. Appl. No. 12/840,977 Final Office Action mailed Dec. 3, 2010.
U.S. Appl. No. 10/359,359 Final Office Action mailed Nov. 27, 2009.
U.S. Appl. No. 10/359,359 Office Action mailed Mar. 31, 2009.
U.S. Appl. No. 10/359,359 Office Action mailed Aug. 27, 2007.
U.S. Appl. No. 10/359,359 Final Office Action mailed Feb. 9, 2007.
U.S. Appl. No. 10/359,359 Office Action mailed Aug. 8, 2006.
U.S. Appl. No. 12/839,306 Office Action mailed Nov. 12, 2010.
U.S. Appl. No. 12/839,311 Office Action mailed Nov. 12, 2010.
U.S. Appl. No. 12/218,581 Office Action mailed Sep. 2, 2010.
U.S. Appl. No. 12/218,581 Office Action mailed Feb. 1, 2010.
U.S. Appl. No. 12/218,581 Office Action mailed Oct. 2, 2009.
U.S. Appl. No. 12/218,591 Office Action mailed Feb. 25, 2009.
U.S. Appl. No. 12/049,954 Final Office Action mailed Dec. 14, 2010.
U.S. Appl. No. 12/049,954 Office Action mailed Jun. 24, 2010.
U.S. Appl. No. 12/235,438 Final Office Action mailed Jan. 4, 2012.
U.S. Appl. No. 12/235,438 Office Action mailed Aug. 8, 2011.
U.S. Appl. No. 12/235,438 Final Office Action mailed Aug. 31, 2010.
U.S. Appl. No. 12/235,438 Office Action mailed Apr. 15, 2010.
U.S. Appl. No. 13/412,361 Final Office Action mailed Nov. 28, 2012.
U.S. Appl. No. 13/412,361 Office Action mailed Jul. 30, 2012.
U.S. Appl. No. 13/941,436 Office Action mailed Jun. 22, 2015.
U.S. Appl. No. 13/918,809 Office Action mailed Jun. 10, 2014.
U.S. Appl. No. 13/412,361 Office Action mailed Jun. 17, 2014.
U.S. Appl. No. 13/941,436 Final Office Action mailed Oct. 7, 2015.
U.S. Appl. No. 13/918,809 Final Office Action mailed Nov. 18, 2015.
U.S. Appl. No. 13/918,809, filed Jun. 14, 2013, Shekhar V. Dhupelia, Method for Ladder Ranking in a Game.
Chinese Application No. 201410266012.9, Office Action mailed Jul. 27, 2016.
U.S. Appl. No. 14/637,182 Office Action mailed Sep. 9, 2016.
U.S. Appl. No. 13/918,809 Final Office Action mailed Oct. 20, 2016.
U.S. Appl. No. 13/918,809 Final Office Action dated May 10, 2017.

* cited by examiner

| Index | Session Master | Active Port/Protocol Type |
|---|---|---|
| 1 | Owns C1 | 80/TCP, 90/UDP |
| 2 | Owns C2, C3 | 85/TCP, 95/UDP |
| 3 | - | |
| . | . | |
| . | . | |
| . | . | |

MANAGING PARTICIPANTS IN AN ONLINE SESSION

CROSS-REFERENCE TO RELATED APPLICATIONS

The present application is a continuation and claims the priority benefit of U.S. patent application Ser. No. 12/840,977 filed Jul. 21, 2010, which is a continuation and claims the priority benefit of U.S. patent application Ser. No. 11/375,526 filed Mar. 13, 2006, now U.S. Pat. No. 7,792,902, which is a continuation and claims the priority benefit of U.S. patent application Ser. No. 10/221,128 filed Jul. 31, 2002, now abandoned, which claims the priority benefit of U.S. provisional application No. 60/381,736 filed May 17, 2002. The disclosure of these commonly owned applications are incorporated herein by reference.

BACKGROUND OF THE INVENTION

Field of the Invention

The present invention relates generally to computer networks and, more particularly, to an application that is run by multiple users on a computer network.

Description of the Related Art

Computer networks, such as local area networks and the Internet, are increasingly being used as the backbone for various transactions and interactions between parties. From online banking, where bank customers can initiate financial transactions on a computer network, to online gaming, where garners can participate in various games over the Internet, service providers are increasingly providing a variety of services over computer networks. There are currently a variety of different computer network configurations that facilitate the transactions and interactions that take place.

One type of configuration is a classic client-server configuration, such as is illustrated in FIG. 1. In this configuration, a dedicated server computer 110 is communicatively linked to one or more client computers 120 over a network, such as through the Internet. The client computer 120 makes service requests to the server computer 110 and the server computer 110 fulfills the request by transmitting data to the requesting client computer 120 over the network. The server computer 110 can be connected to a data storage device or to other computer devices that facilitate transactions between the client and server computers. One characteristic of the client-server configuration is that the client computers cannot communicate directly with one another, as the client computers are limited to communicating with the server computer.

For example, where the client-server configuration is operated in an online gaming environment, the server computer 110 can be responsible for maintaining the various states that are associated with the online game. The server computer can be connected to other computers, such as a memory engine 140 that maintains one or more instances of a game, while the server computer 110 manages administrative matters such as player matching and account management. A game player on the client computer 120 can log onto the server computer 110 and receive a list of available games and participating players. The player chooses a game to start or join, thereby identifying a memory engine with which the player's computer establishes a client-server connection. In this manner, the server computer 110 and the memory engine 140 collectively administer the gaming environment for one or more client computers 120.

Another type of configuration is referred to as an integrated server configuration, such as is shown in FIG. 2. This configuration includes a dedicated server computer 110 and one or more client computers 120 that are each connected to the server computer 110 over a computer network. As in the previously-described configuration, the server computer 110 serves data to the client computers 120. However, one of the client computers 120, such as the client computer 120a, functions as an integrated server in that the client computer 120a can serve data to the other client computers 120. In an online gaming environment, the server computer 110 can perform administrative functions, such as player matching, account management, and chat room management, while the client computer/integrated server 120a can perform the function of the previously-described memory engine.

In yet another type of communication configuration, the various computers are arranged in a peer-to-peer configuration, such as is shown in FIG. 3. In a peer-to-peer configuration, each of the computers can communicate with the others, so that all of the computers function as "peers." In one form of the peer-to-peer configuration, a dedicated server 110 is communicatively connected to a plurality of client computers 120 over a network. An online session is initially established by each of the client computers 120 connecting to an administrative computer, such as the server computer 110. The client computers 120 are then communicatively connected to one another so that each of the client computers 120 has the ability to both serve and receive data to and from any of the other client computers 120. In addition, each client computer 120 can operate in a client-server relationship with the dedicated server 110. Those skilled in the art will appreciate that there are other communication configurations in addition to the configurations described above.

The various configurations described above enable computer users to interact over a computer network, such as in an online game environment where game players can play computer games on a computer network. In such a scenario, at least one of the computers typically functions as a game manager that manages various aspects of the game, such as coordinating the number of players, keeping track of game state, and sending out updates to the users regarding game state. It can be appreciated that continuity of game play can be highly dependent on all of the users in a game continuing to play throughout the entire game period. Game play can be interrupted or even halted if one of the game players exits during the middle of a game, particularly where the exited player was managing a portion of the game.

For example, sports games typically have a fixed start and a fixed finish for the game, with at least two players competing in a game. In current configurations, there are often several players that participate in an online sporting contest, with each one of the players assuming the role of a player on a sporting team. For example, in an online football game, players can assume the roles of quarterback, receiver, defensive back, running back, etc. If one of the players were to suddenly leave during the middle of the game, then the game play would be interrupted or halted. This could also be the case in other types of games, where continuity of game play is dependent on each of the players in the game environment continuing to play throughout a particular scenario.

Unfortunately, current multi-user applications are not configured to account for when a participant in an online session suddenly or unexpectedly leaves the online session. If a player does leave an online session, then the session is unduly interrupted or terminated. In view of the foregoing, there is a need for a multi-user application that overcomes the aforementioned shortcomings.

SUMMARY OF THE PRESENTLY CLAIMED INVENTION

The present invention relates to an application that is configured to be operated in a multi-participant environment on a computer network. The application manages participants in an online session of a multi-user application so that if one of the participants exits the session, the session can continue without interruption. In accordance with one aspect of the invention, the application initiates an online session of the multi-user application, wherein the online session includes two or more participants comprised of network computers that are communicatively linked to a computer network. If the application detects that a first participant has disconnected from the online session, wherein the first participant is responsible for managing certain managerial functionality associated with the running of the multi-user application, then the application broadcasts a notification to existing participants of the online session over the communication network, thereby notifying the existing participants that the first participant has disconnected from the online session. The initiating application then re-assigns the functionality associated with the first participant to an existing participant of the online session. The participants can be communicating in a peer-to-peer arrangement or can be performing server duties in a client-server arrangement.

Other features and advantages of the present invention should be apparent from the following description of the preferred embodiment, which illustrates, by way of example, the principles of the invention.

BRIEF DESCRIPTION OF THE DRAWINGS

FIG. 5 is an illustration of a data structure that includes computer index and session master information for the multi-user application.

DETAILED DESCRIPTION

Figure 4:
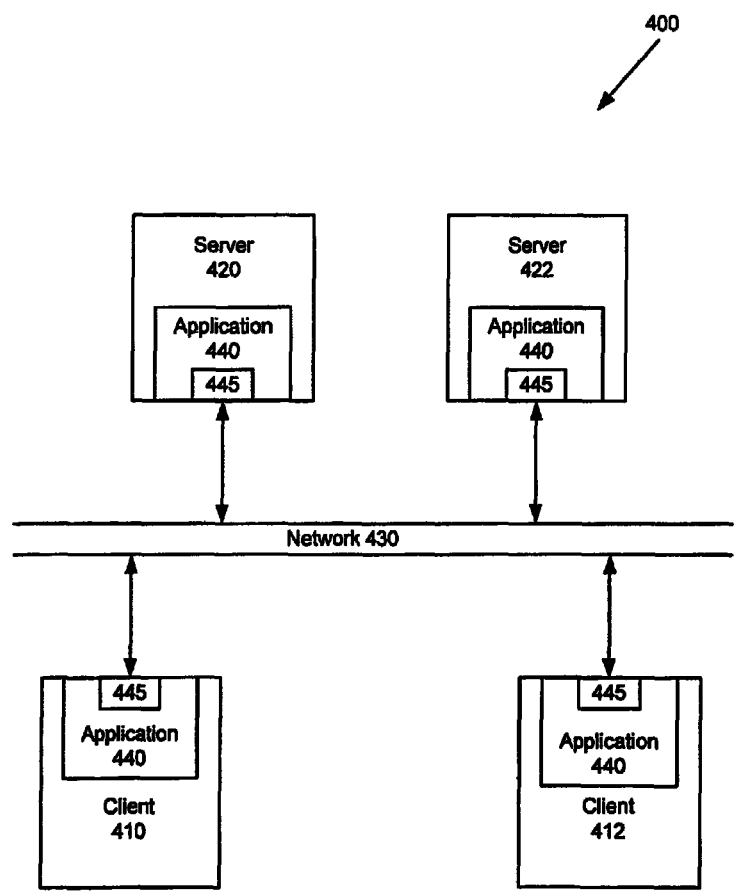
FIG. 4 is an illustration of a computer network system on which is run a multi-user application configured in accordance with the present invention.

Embodiments FIG. 4 is a block diagram of a computer network system 400 comprised of one or more network devices including one or more client computers 410, 412 and one or more dedicated server computers 420, 422, which are nodes of a computer network 430. Thus, some of the network computers are configured as servers and some are configured as clients. The computer network 430 may comprise a collection of interconnected networks, such as the Internet, and may include one or more local area networks at each of the nodes 410, 412, 420, 422. As used herein, the term "Internet" refers to a collection of interconnected (public and/or private) networks that are linked together by a set of standard communication protocols to form a global, distributed network.

The client computers 410, 412 can transmit requests for data over the network 430 to one of the server computers 420, 422, which are configured to serve data over the network 430 to the client computers in a well-known manner. The server computers 420, 422 can include or can be communicatively linked to each other and to other servers, such as a data base server and/or an application server, as will be known to those skilled in the art. Although FIG. 4 shows only two client computers 410, 412 and two server computers 420, 422, it should be appreciated that the network system 400 could include any number of client computers 410, 412 and server computers 420, 422. The server computers 420, 422 and client computers 410, 412 are sometimes referred to collectively herein as network computers.

The network system 400 supports a multi-user application 440 comprised of a computer program with which multiple users can interact in online sessions using network devices (such as the client computers 410, 412) that are linked to the computer network 430. The application 440 is installed at each of the client computers, meaning that an operational instance of the application is stored in memory of each of the client computers 410, 412 that run (execute) the application 440. Each server computer that will be participating in an online session of the multi-user application also stores an instance of the application 440. For purposes of this description, the first server computer 420 will be assumed to be a server for the multi-user application being executed by the client machines 410, 412, although both servers 420, 422 are shown with installed applications 440. An exchange of data occurs between instances of the application 440 during execution and is enabled through the establishment of network sockets 445 at each of the network computers. The sockets are represented in FIG. 4 as boxes at each respective network computer. Those skilled in the art will understand that a network socket is one end of a multi-way communication link between two or more programs that run on the network system 400.

Figure 1:
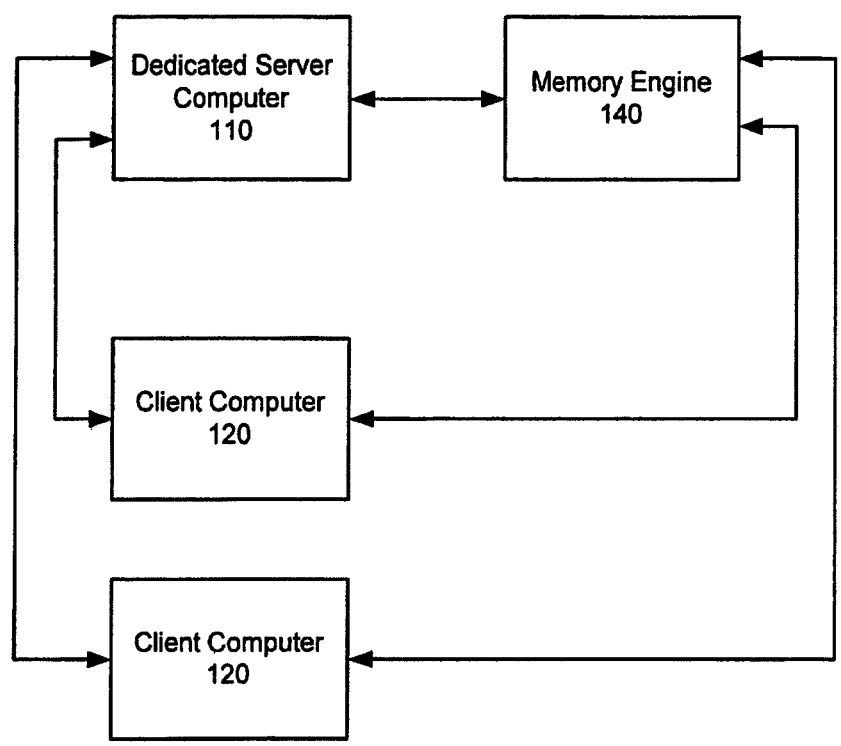
FIG. 1 is an illustration of a computer network arranged in a client-server network communication configuration.
Figure 2:
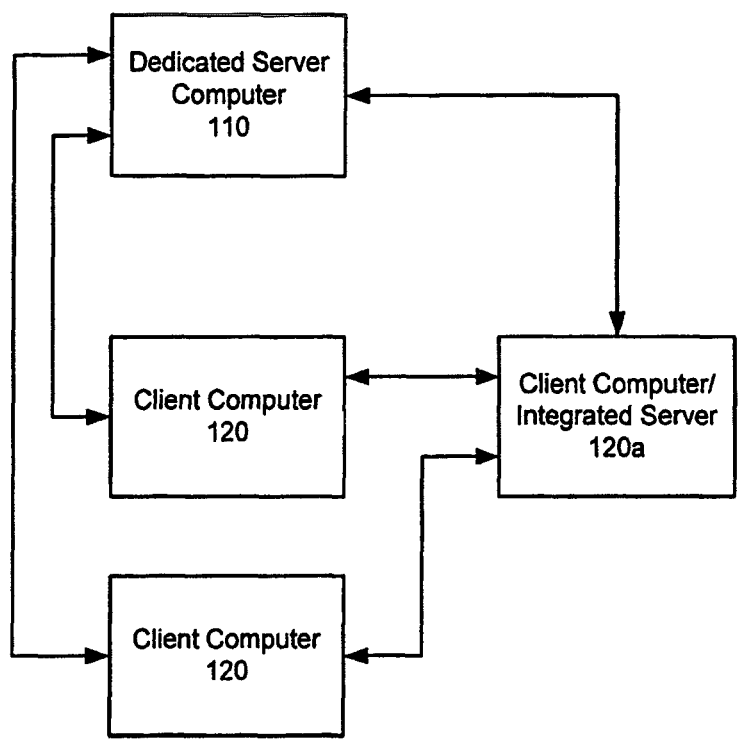
FIG. 2 is an illustration of a computer network arranged in an integrated network communication server configuration.
Figure 3:
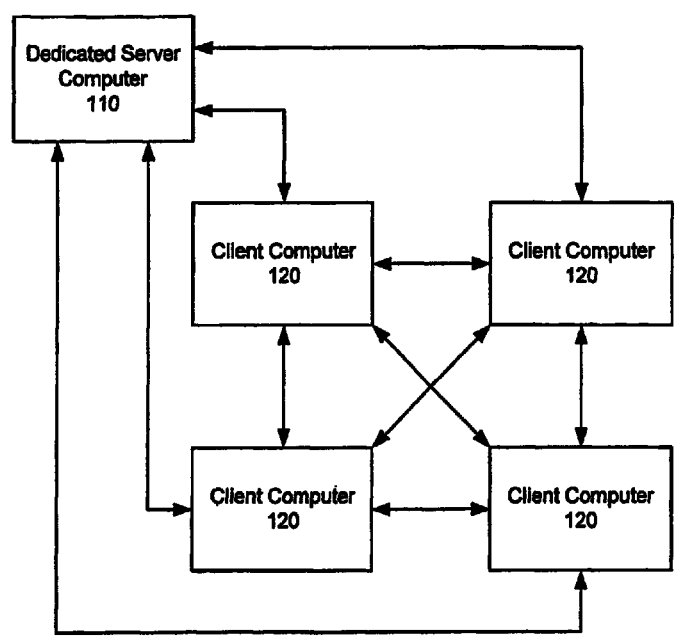
FIG. 3 is an illustration of a computer network arranged in a peer-to-peer network communication configuration.

The application 440 can be run on the network devices of the network system 400 according to a variety of communication configurations and the responsibilities for various application-related processes can be assigned to different computing devices of the network 430, as described in more detail below. An application development interface is preferably used to develop the application 440, as is also described in more detail below. The application can be operated such that the associated network computer can use a communications configuration to implement any of the communication modes illustrated in FIG. 1, FIG. 2, and FIG. 3.

The multi-user application 440 can be any type of application that a user can run on a network computer that is linked to the computer network 430. When the application 440 is run on a client computer 410, 412, the user can interact with other users through other network computers that are also running the application 440. The server computer 420 can function as a central network "meeting point" through which the users can establish contact, maintain data, and initiate an online session of the application 440. Typically, the application 440 causes the network device in which it is operating to establish communications with another network device, such as the devices 410, 412, 420, thereby initiating an online session. During the online session, the network computers will interact and exchange data pursuant to the programmed features of the application 440.

When the application 440 is launched and an online session is established among suitably configured computers, the application enables the computers to interact in a variety of configurations. Throughout this description, the application 440 is sometimes described in an online-gaming scenario, wherein the application 440 comprises a computer game that multiple users can access and run using the client computers 410, 412. In such a case, the application 440 establishes an online session comprised of a game in which the network computers participate. However, it should be appreciated that the application 440 may also relate to other scenarios besides gaming, such as, for example, online banking or online travel planning, that involve interactions between multiple computers on a computer network.

When an application 440 executes, it identifies a session master, which is a network computer that performs a variety of managerial and administrative functions for the application with respect to interactions between computers that occur during an online session. An online session of the application uses a registration or logon process with a data store containing information such as user identification. The logon process authorizes further participation in the network environment of the application. Preferably, the session master function is assigned when a client computer running the application 440, such as the client computer 410, logs onto the server computer 420 to initiate an online session. The application itself, however, determines the details of when and how such assignments are made, so that a variety of session master assignment schemes can be implemented without departing from the teachings of the present invention.

The operating instance of the application on the client computer 410 that initiates an online session of the application is referred to as the host computer. The application at the host computer assigns the session master function to either the server computer 420 or to the host computer 410. As new client computers log-on (register) with the server computer 420 to join the online session, the server computer 420 notifies the new clients of the already-assigned identity of the session master computer.

As described more fully below, the session master functionality enables a smooth transition between the various network communication configurations in which the application 440 can operate. The session master function also enables the application 440 to concentrate responsibility for application-related tasks in a specific network computer, or to distribute such responsibility among two or more network computers. The assignment of tasks can be performed by an instance of the application 440 on one of the network computers, at the same time when the session master function is assigned, and the session master tasks can be assigned to one or more of the computers on the network 430 for providing the requisite functionality. The computer or computers that are assigned responsibility of the session master are referred to herein as the "owners" of the respective session master functions. References to a solitary session master will be understood to apply to a group of computers, if those computers are collectively performing the session master functions. Thus, the assignment of session master tasks is performed in the manner specified by the application, in accordance with the dictates of the application developer.

One category of responsibilities assigned to the session master relates to application-specific functions, which are functions that are peculiar to the particular type of application 440 being executed. For example, if the application 440 is a game-type application, then the session master or a group of session masters can keep track of game-type data, such as the game score and the time remaining in the game, and can perform game functions, such as terminating the online session when a game ends. A session master computer can also be assigned the responsibility of keeping track of specific game data, such as the state of an object in the game environment, such as a football, aircraft, ocean, tree, and so forth. Each of these responsibilities can be concentrated in a single session master computer or can be divided up among several session master computers, in accordance with the operation of the application.

The host computer performs managerial functions related to the computers that are participating in the online session. For example, whenever a network computer joins an online session of the application 440, the host computer assigns an identification index number to the computer joining the session. The host computer maintains a list of the identification index numbers and their associated network computers. The index number is used when sending messages and is also used to maintain ownership records regarding the session master functionality.

As noted above, there can be more than one session master in an online session. The way in which a session master is assigned can be determined by the application in accordance with the operation of the application. The application 440 can also assign the session master with responsibility for sending out update messages to update the network computers regarding the status of all network computers that are participating in the online session. This responsibility entails the session master notifying the participating network computers when a new network computer joins the online session, or when a current participant exits the online session of the application 440, as described more fully below.

The host computer that assigns the aforementioned index number to each of the computers also maintains a list of all network computers that are participating in the online session. The application 440 then keeps track of session master ownership according to the index number assigned to the computer. To keep track of the index number and responsibility assignments, the application 440 can maintain a data structure such as in the form of a table comprised of a network computer index list, such as the table 500 shown in FIG. 5. The table 500 contains an index number associated with each network computer that is participating in the online session, and also contains an indication of whether the network computer owns the session master function. The index list data structure comprising the table 500 preferably also specifies the communication protocol that is being used for each network computer. FIG. 5 shows that different session master tasks (C1, C2, C3) can be owned by different network computers.

In addition to specifying the communication protocol, the data structure also specifies, for each network computer, the port for which the communication protocol is associated. Each instance of the application 440 enables the associated network computer that is participating in the online session to open multiple communication ports, with each port being associated with a particular communication protocol. The network computers communicate with other network computers using a particular port and a particular protocol, which is specified in the data structure comprised of the table 500 shown in FIG. 5. The ports can comprise network sockets through which the instances of the application 440 communicate over the network. The network computers preferably communicate the port/protocol information, as well as the other information contained in the index list, by periodically sending communication messages to one another over the network.

Preferably, all of the computers that are participating in the online session keep their own copy of the table 500 index list. It should be appreciated that the table 500 is merely exemplary and that the initiating host application 440 could keep track of client index numbers and session master ownership in other manners using a wide variety of data structure formats. Alternatively, the session computers can share one or more copies of the table.

The initiating application 440 can operate in various communication configurations depending on how the application 440 assigns ownership of the session master. In a first configuration, shown in FIG. 6, the initiating application 440 has assigned ownership of a session master 600 to a single computer, such as the dedicated server computer 420. Therefore, this computer 420 has responsibility for all of the tasks associated with the session master function as dictated by the initiating application 440. Thus, the application 440 operates in a client-server communication configuration with respect to the functions of the session master, with the server computer 420 serving data to the client computers 410 relating to the session master responsibilities.

Figure 6:
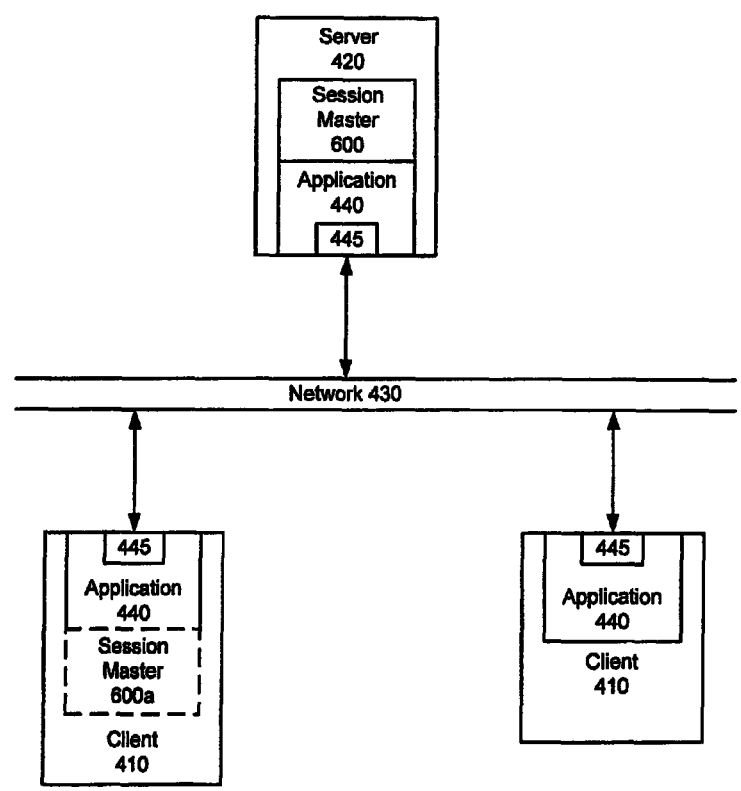
FIG. 6 is an illustration of a computer network system wherein the multi-user application is arranged in a first type of communication configuration.

It should be appreciated that any of the computers that are participating in the online session of the application 440 could have ownership of one or more of the session master tasks, such as where one of the client computers 410 is shown owning a session master 600a, which is shown in FIG. 6 using phantom lines. This indicates that the client computer has been assigned and is performing one or more session master tasks, along with or in place of the nominal session master server computer 420. That is, there can be several instances of a session master among the computers participating in an online session, with each instance of a session master being assigned specific responsibilities and each session master task being assigned to a different network computer, or multiple tasks being assigned to the same computer. For example, FIG. 6 shows a situation where there are two session masters 600 and 600a, each being assigned responsibility for certain functionality relating to the online session of the application 440. The server computer 420 has certain responsibilities and the client computer 410 also has certain responsibilities, as determined by the application. This is an integrated server configuration, where the client computer 410 that owns the session master 600a is functioning as an integrated server. An "integrated server" refers to a situation in which all clients send information to a client that is designated as an integrated server, and where that integrated server propagates the information to the other clients. The client acting as the integrated server can also own one or more session master tasks.

Figure 7:
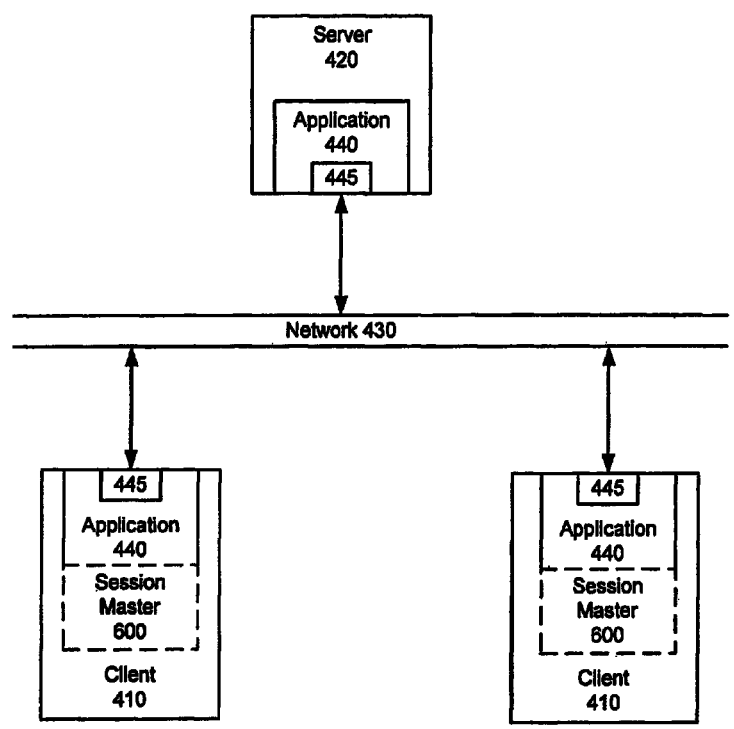
FIG. 7 is an illustration of a computer network system wherein the multi-user application is arranged in another type of communication configuration.

In another scheme, shown in FIG. 7, the application 440 has distributed ownership of the session master 600 among several computers. In the illustrated example, both of the client computers 410 share ownership of the session master 600. In such a case, both of the computers could perform the functions associated with the session master so that the network computers in FIG. 7 are in a peer-to-peer configuration. Regardless of the particular communication configuration in which the application 440 operates, the online session of the application includes various network participants comprised of the network computers that are running the application and interacting pursuant to the online session. If one of the participants in the online session were to exit the session, then this may result in an interruption for the other participants that remain in the session. In accordance with one aspect of the invention, the application 440 is configured to handle situations where a participant exits an online session in order to minimize the interruption for remaining participants.

Figure 8:
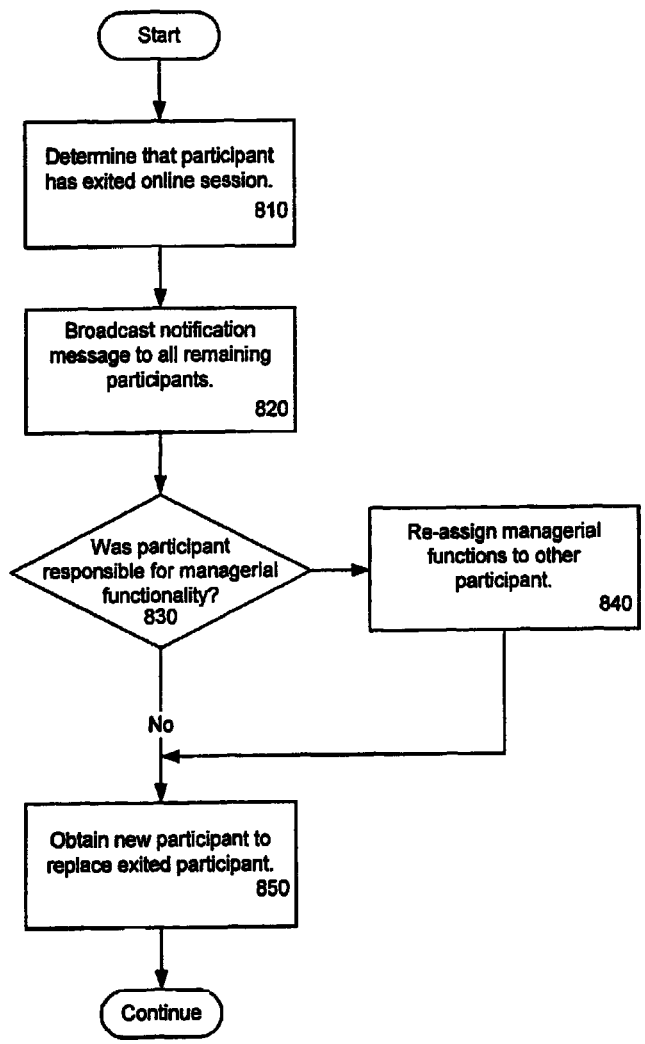
FIG. 8 is a flow diagram that represents a process of managing the exiting of a participant in an online session of a multi-user application.

This is described in more detail with reference to the flow diagram shown in FIG. 8, which describes a process of managing the exiting of a participant in an online session of the multi-user application 440. In the first operation, represented by the flow diagram box numbered 810, it is determined that a participant of the online session of the application has exited the online session. The determination that a participant has exited the online session can be made in a variety of manners. In one embodiment, the instance of the application 440 on a network computer participating in the online session periodically causes the network computer to broadcast an update message notifying the other network computers of its presence in the online session. If no update message is received from a particular network computer within a predetermined amount of time, then it is deemed that the network computer has exited the online session. During establishment of the online session, the instance of the application 440 on the computer that starts the online session may assign a particular computer, such as the session master computer, with the responsibility for making the determination that a participant has exited the online session.

In the next operation, represented by the flow diagram box numbered 820, the instance of the application 440 in one of the computers causes a notification message to be broadcast to all of the participants in the online session notifying them that a participant (the "exited participant") has exited the session. Only one of the network computers, such as, for example, the session master computer, broadcasts the notification message to all of the participants. If the session master computer is the exited computer, then one of the other network computers broadcasts the message, such as the computer with the next consecutive index after the session master computer. The notification message preferably includes the index that was previously assigned to the network computer for the exited participant. In this manner, the other participants can identify the exited participant by consulting the index table that was discussed above with respect to FIG. 5.

The next operation differs based upon whether the participant that exited the session was responsible for performing any session managerial functions that would affect the other participants of the online session, as represented by the decision box numbered 830. The managerial functions include functions such as filtering communication messages, assigning identification indices, score-keeping, keeping track of session times, keeping track of items that are located in an online world, keeping track of participant locations in an online world, etc. If the participant that exited the session was responsible for performing any such functions, a "Yes" result from the decision box 830, then the process proceeds to the operation represented by the flow diagram box numbered 840. In this operation, the application 440 reassigns the managerial responsibilities of the exited participant to a network computer of another participant that is still present in the online session. The reassignment of managerial responsibilities is preferably performed by an instance of the application 440 on a specific computer, such as the computer that has the next consecutive index after the index of the computer that exited the online session. For example, a computer with a first index may exit the session. The instance of the application on computer with the next consecutive index (as specified in the table 500 shown in FIG. 5) then performs the re-assignment of the exited computer's duties.

The manner in which the application 440 re-assigns the responsibilities can vary. In one embodiment, the application 440 automatically selects the participant that is re-assigned the responsibilities based on certain factors, some of which are related to the conditions of the network computers of the participants. The conditions can include, for example, the communication environment, geographical location, and hardware specification of the network computers, as well as user-specified preferences.

The communication environment relates to whether the network computer of the participant has large bandwidth capabilities, such as through a cable-modem or DSL. Preferably, those participants with higher bandwidth capabilities are given higher preference for assuming the responsibilities of the exited participant. The geographic location of the participants can also be a factor in deciding which participant is re-assigned the responsibilities of the exited participant. For example, a participant that is centrally located to the other participants may be given a higher priority in order to minimize the latency for communications. The hardware specifications of the network computers that are participating in the online session are also a factor. The application 440 may give higher priority to network computers that have hardware capabilities that are most highly suited for the responsibilities that are being re-assigned, such as computers with powerful data processing capabilities.

In another embodiment of the operations of flow diagram box 840, the application 440 simply randomly re-assigns the responsibilities of the exited participant to another of the participants of the online session. The application 440 can also consider user-specified preferences. Some users may specify to the application 440 that they do not want to be assigned the responsibility of managing any application functionality. The users may also specify that a particular participant should be re-assigned responsibilities should another participant exit the online session. Alternately, the application 440 may cause a message to be broadcast to all of the participants of the online session asking whether any of the participants would like to take over the responsibilities that were previously assigned to the exited participant.

The next operation is represented by the flow diagram box numbered 850. This operation occurs after the application 440 has re-assigned the responsibilities of the exited participant. The operation of flow diagram box 850 also occurs if the exited participant did not have any responsibilities that needed re-assignment, which would have resulted in a "No" outcome from the decision box numbered 830. In this operation, the application 440 attempts to obtain a new participant to replace the exited participant. The attempt is preferably performed by the instance of the application 440 on a specific computer, such as the session master computer. It should be appreciated that this operation differs from the operation of flow diagram box 840 in that this operation relates to obtaining a replacement participant for the online session to take the place of the exited participant, rather than re-assigning the managerial functions of the exited participant.

For example, the online session may be an online football game, where the participants are each a player on a common team. One of the participants may have been assigned managerial functions comprised of keeping track of the score and of the game time. That same participant may have played the role of the quarterback in the game. If the participant exits the online game during the game, then the application 440 re-assigns the managerial functions (i.e., score keeping and game time responsibilities) of the exited participant to another participant in the operation 840 and then, in operation 850, attempts to obtain a new participant to replace the exited participant's role as quarterback.

The manner in which the application 440 attempts to obtain a replacement participant for the online session may vary. In one embodiment, the application 440 automatically assigns a network computer, rather than a human, as a replacement for the exited participant. The network computer thereby would perform the functions of the exited participant. In another embodiment, the application 440 maintains a list of network computer that might be able to participate in the online session and then sends a message to those computers inviting them to participate in the session. The application 440 may put the online session in a pause mode while a replacement participant is obtained.

The application 440 is preferably developed using a software development kit (SDK) that provides a library of object and communication message definitions that are used in the application 440. The software development kit includes an application interface through which applications that are developed using the SDK can run on a network system, such as the network system 400. The application interface can reside in a central network server, such as the server 420, to which network computers that have the application 440 can log onto in order to operate an online session of the application. By using the object and message types provided by the SDK, the application 440 can be developed to include the features described above. The SDK preferably includes an object definition structure that provides a client-based definition of objects that are utilized by the application 440. The object definition includes a plurality of characteristics associated with each object and utilized by the application to effect interaction with clients over the computer network.

Figure 9:
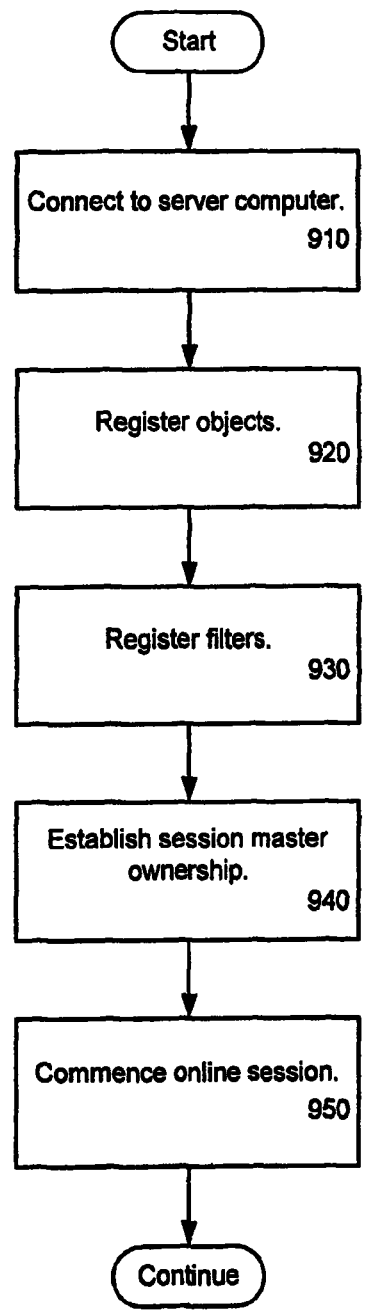
FIG. 9 is a flow diagram that illustrates the operating steps associated with the multi-user application establishing an online session.

Once the application 440 has been developed using the SDK, the application 440 can be loaded onto one or more network computers and an online session can be established according to the operations shown in the flow diagram box of FIG. 9. In the first operation, represented by the flow diagram box numbered 910, a network computer on which the application 440 is loaded connects to a network computer that includes in memory that application interface software. For example, one or more of the client computers 410 of the network system 400 shown in FIG. 4 may have the application 440 loaded in memory and the server computer 420 may include the application interface. In such a case, the client computers 410 establish a communication connection with the server computer 410 over the network 430.

In the next operation, represented by the flow diagram box numbered 920, the application 440 registers objects according to the object definitions that are available in the library of the application interface. The application 440 also registers any message filters that will be utilized during the online session, as represented by the flow diagram box numbered 930.

In the next operation, represented by the flow diagram box numbered 940, the application 440 defines the session master and assigns ownership of the session master to one of the network computers. The ownership of the session master can be assigned to one computer or can be assigned to plural computers. The application 440 also specifies whether the ownership of the session master is dedicated to a particular computer or whether ownership can migrate to other computers.

During this operation, the application 440 assigns client indices to each of the network computers that will participate in the online session and also establishes the index table described above. The application 440 can be configured such that the first network computer to log onto the server computer will be the session master and also receive an initial index, such as an index of one or zero. It should be appreciated that the initial index may vary. Subsequent network computers to log on will then receive the next available index. After the ownership of the session master or session masters has been established, the online session of the application 440 is commenced, as represented by the flow diagram box numbered 950.

Figure 10:
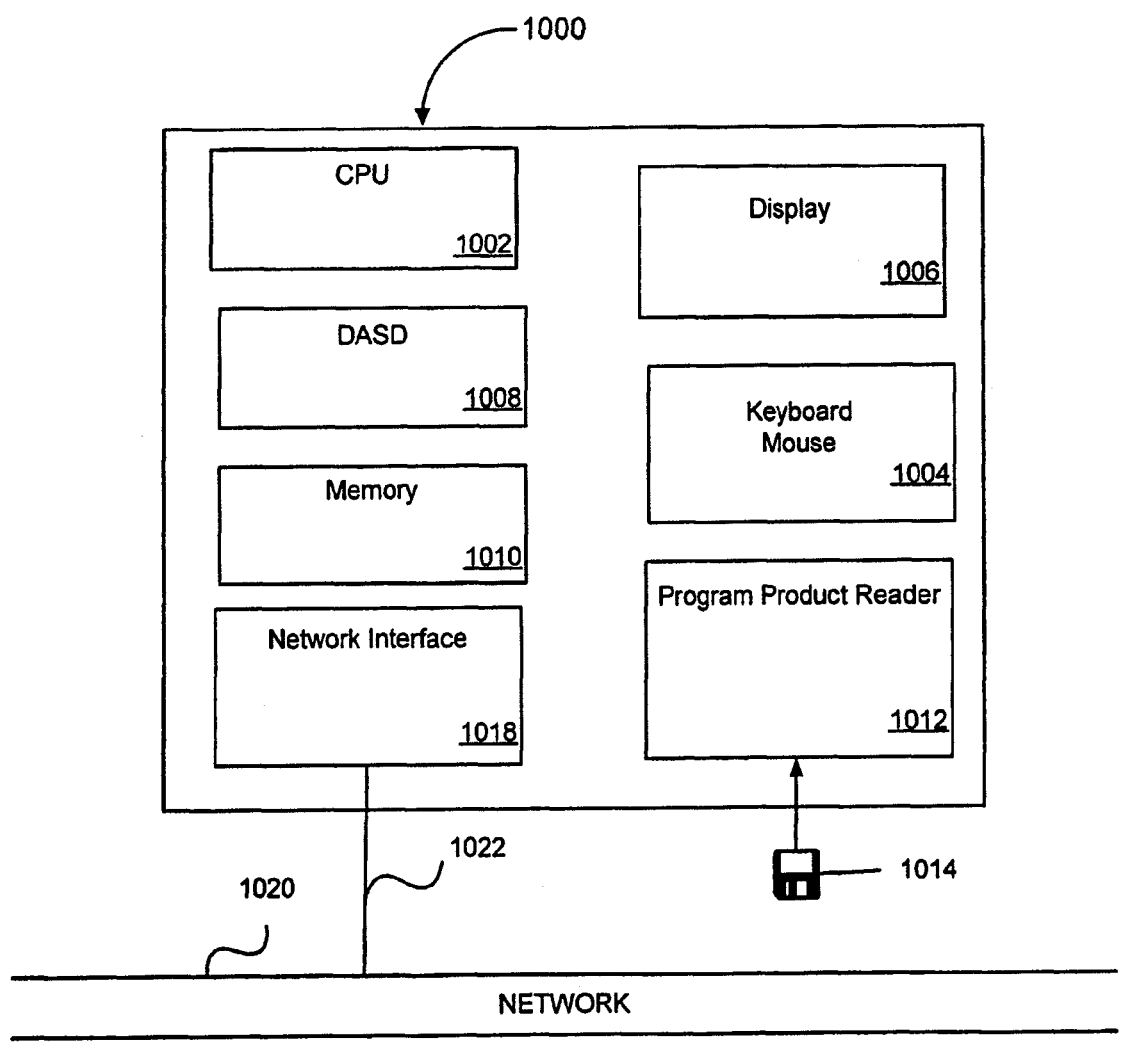
FIG. 10 is a block diagram of a computer in the network illustrated in FIG. 4, illustrating the hardware components.

As noted above, the network computers shown in the block diagram of FIG. 4 comprise nodes of a computer network system 400. FIG. 10 is a block diagram of a computer in the system 400 of FIG. 4, illustrating the hardware components included in one of the computers. Those skilled in the art will appreciate that the devices 410 and 420 may all have a similar computer construction, or may have alternative constructions consistent with the capabilities described herein.

FIG. 10 shows an exemplary computer 1000 such as might comprise any of the network computers. Each computer 1000 operates under control of a central processor unit (CPU) 1002, such as a "Pentium" microprocessor and associated integrated circuit chips, available from Intel Corporation of Santa Clara, Calif., USA. A computer user can input commands and data from a keyboard and computer mouse 1004, and can view inputs and computer output at a display 1006. The display is typically a video monitor or flat panel display. The computer 1000 also includes a direct access storage device (DASD) 1008, such as a hard disk drive. The memory 1010 typically comprises volatile semiconductor random access memory (RAM). Each computer preferably includes a program product reader 1012 that accepts a program product storage device 1014, from which the program product reader can read data (and to which it can optionally write data). The program product reader can comprise, for example, a disk drive, and the program product storage device can comprise removable storage media such as a magnetic floppy disk, a CD-R disc, a CD-RW disc, or DVD disc.

Each computer 1000 can communicate with the others over a computer network 1020 (such as the Internet or an intranet) through a network interface 1018 that enables communication over a connection 1022 between the network 1020 and the computer. The network interface 1018 typically comprises, for example, a Network Interface Card (NIC) or a modem that permits communications over a variety of networks.

The CPU 1002 operates under control of programming steps that are temporarily stored in the memory 1010 of the computer 1000. When the programming steps are executed, the computer performs its functions. Thus, the programming steps implement the functionality of the application 440. The programming steps can be received from the DASD 1008, through the program product storage device 1014, or through the network connection 1022. The program product storage drive 1012 can receive a program product 1014, read programming steps recorded thereon, and transfer the programming steps into the memory 1010 for execution by the CPU 1002. As noted above, the program product storage device can comprise any one of multiple removable media having recorded computer-readable instructions, including magnetic floppy disks and CD-ROM storage discs. Other suitable program product storage devices can include magnetic tape and semiconductor memory chips. In this way, the processing steps necessary for operation in accordance with the invention can be embodied on a program product.

Alternatively, the program steps can be received into the operating memory 1010 over the network 1020. In the network method, the computer receives data including program steps into the memory 1010 through the network interface 1018 after network communication has been established over the network connection 1022 by well-known methods that will be understood by those skilled in the art without further explanation. The program steps are then executed by the CPU 1002 thereby comprising a computer process.

It should be understood that all of the network computers of the network system 400 illustrated in FIG. 4 may have a construction similar to that shown in FIG. 10, so that details described with respect to the FIG. 10 computer 1000 will be understood to apply to all computers of the system 400. It should be appreciated that any of the network computers can have an alternative construction, so long as the computer can communicate with the other computers over a network as illustrated in FIG. 4 and can support the functionality described herein.

Figure 11:
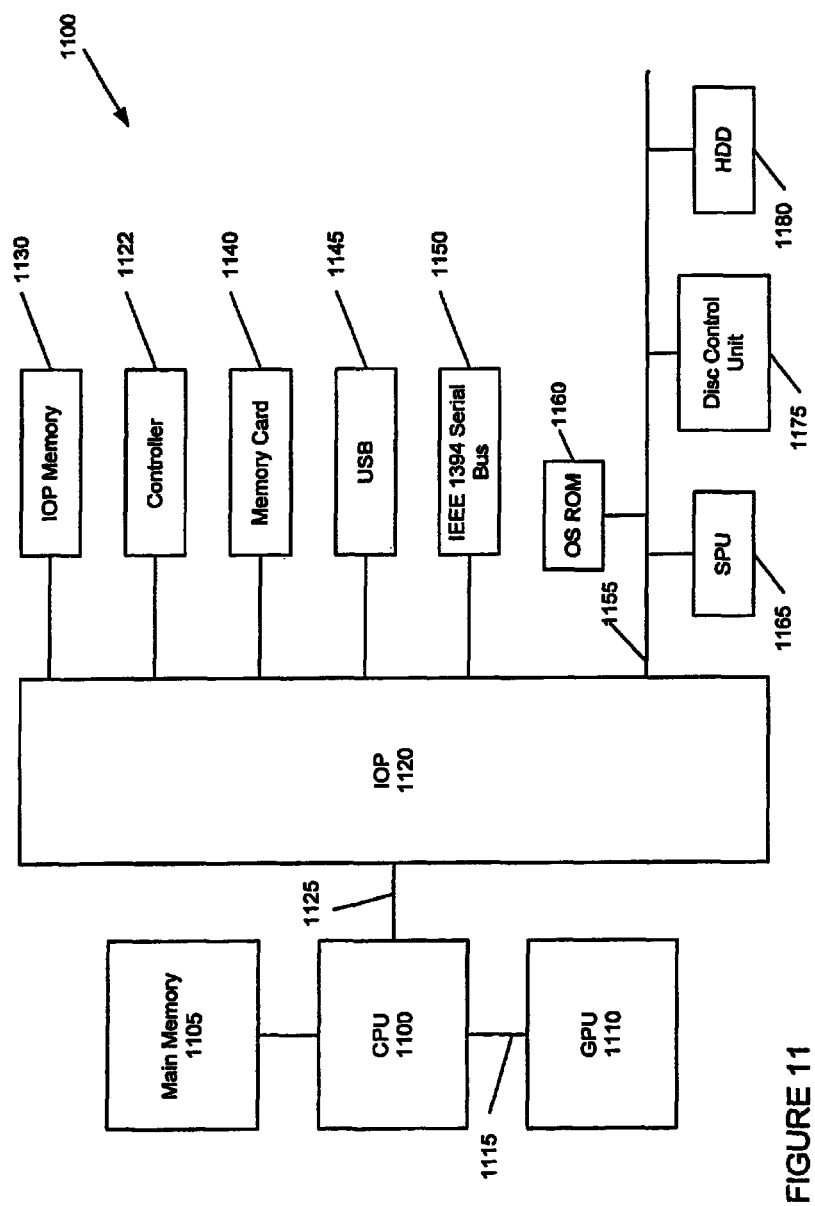
FIG. 11 is a block diagram of a computer entertainment system in the network illustrated in FIG. 4, illustrating the hardware components.

For example, with reference to FIG. 11, the client computers 420 can comprise a computer entertainment system, such as a video game system 1100. FIG. 11 is a block diagram of an exemplary hardware configuration of the video game system 1100.

The video game system 1100 includes a central processing unit (CPU) 1100 that is associated with a main memory 1105. The CPU 1100 operates under control of programming steps that are stored in the OS-ROM 1160 or transferred from a game program storage medium to the main memory 1105. The CPU 1100 is configured to process information and to execute instructions in accordance with the programming steps.

The CPU 1100 is communicatively coupled to an input/output processor (IOP) 1120 via a dedicated bus 1125. The IOP 1120 couples the CPU 1100 to an OS ROM 1160 comprised of a non-volatile memory that stores program instructions, such as an operating system. The instructions are preferably transferred to the CPU via the IOP 1120 at start-up of the main unit 1100.

The CPU 1100 is communicatively coupled to a graphics processing unit (GPU) 1110 via a dedicated bus 1115. The GPU 1110 is a drawing processor that is configured to perform drawing processes and formulate images in accordance with instructions received from the CPU 1100. For example, the GPU 1110 may render a graphics image based on display lists that are generated by and received from the CPU 1100. The GPU may include a buffer for storing graphics data. The GPU 1110 outputs images to an audio-visual output device.

The IOP 1120 controls the exchange of data among the CPU 1100 and a plurality of peripheral components in accordance with instructions that are stored in an IOP memory 1130. The peripheral components may include one or more input controllers 1122, a memory card 1140, a USB 1145, and an IEEE 1394 serial bus 1150. Additionally, a bus 1155 is communicatively coupled to the IOP 1120. The bus 1155 is linked to several additional components, including the OS ROM 1160, a sound processor unit (SPU) 1165, an optical disc control unit 1175, and a hard disk drive (HDD) 1180.

The SPU 1165 is configured to generate sounds, such as music, sound effects, and voices, in accordance with commands received from the CPU 1100 and the IOP 1120. The SPU 1165 may include a sound buffer in which waveform data is stored. The SPU 1165 generates sound signals and transmits the signals to speakers.

The disc control unit 1175 is configured to control a program reader, which can comprise, for example, an optical disk drive that accepts removable storage media such as a magnetic floppy disk, an optical CD-ROM disc, a CD-R disc, a CD-RW disc, a DVD disk, or the like.

The memory card 1140 may comprise a storage medium to which the CPU 1100 may write and store data. Preferably, the memory card 1140 can be inserted and removed from the IOP 1120. A user can store or save data using the memory card 1140. In addition, the video game system 1100 is preferably provided with at least one hard disk drive (HDD) 1180 to which data may be written and stored.

A data I/O interface, such as an IEEE 1394 serial bus 1150 or a universal serial bus (USB) 1145 interface, is preferably communicatively coupled to the IOP 1120 in order to allow data to be transferred into and out of the video game system 1100, such as to the network 430 of FIG. 4.

The system and method described above improve on the situation where a network user of an application, such as a game player, is performing as an Integrated Server (IS) for the application, thereby maintaining an application environment, so that the application would end for a conventional implementation of the application when that IS user wishes to log off. As described above, some applications (such as multi-user gaming applications) alternatively permit the functions (and data) of the departing user to be migrated from the departing user to a different user, who will continue with the online session and will take over the duties of the IS. This type of hand-off is typically rather cumbersome and might not be accomplished smoothly. In the case of a gaming environment, for example, a departing player might abruptly disappear from the game environment, thereby disrupting the gaming experience of the other players. The multi-user application in accordance with the invention permits continued use of the application, even with users departing and joining, by notifying all user machines when another user has departed from the session. Suitable adjustments can be made for a more pleasing application environment. The notification occurs through a Disconnect function that ensures proper IS operation and communications. That is, an application server or IS of the application can broadcast a message to all clients in an application environment to notify them that a user has departed or has joined, and can ensure appropriate functionality, if necessary, of the users.

For a system with a network device operating as an Integrated Server (IS) as described above by serving application data to other users, the failure or departure of an IS from the application environment is responded to by assigning a different user as a new IS. The application can assign a new IS by automatically carrying out a replacement process, or by sending a broadcast message to all users and awaiting replies. For automatic selection, the application can assign the new IS in accordance with considerations that include the bandwidth available to the user, the geographic location of the potential new IS, a user's indicated preference for consideration as an IS, the technical specification and resources available at the user's machine, or through a random selection process. If the application is designed so that it sends a broadcast message, then the message will typically solicit voluntary agreement to operate as the new IS.

In addition, a new user who logs in to the system after an IS failure and who otherwise might have been registered with the failed IS can instead be diverted to a different IS, reducing the workload of the group being served by the now-unavailable IS. In this way, newcomers who wish to join the application environment of an IS can instead be moved to a different IS and different user group. Alternatively, the application can respond to a failed IS by dissolving or disbanding the online session of the group administered by the unavailable IS and forming a new online group with a new IS. These alternatives can be selected by an application developer who is configuring an application for operation in accordance with the present invention.

If an individual user leaves during an online session, the result can be somewhat more problematic. In the online gaming context, for example, a certain minimum number of users (players) are required for a game to proceed. In accordance with the invention, the application can respond by sending a message to other users on the network, inviting others to join the online session and participate in the multi-user application (such as a game). Alternatively, the application can be configured so as to invoke an Artificial Intelligence module to carry out the duties of the Integrated Server.

The present invention has been described above in terms of a presently preferred embodiment so that an understanding of the present invention can be conveyed. There are, however, many configurations for the system and application not specifically described herein but with which the present invention is applicable. The present invention should therefore not be seen as limited to the particular embodiment described herein, but rather, it should be understood that the present invention has wide applicability with respect to multi-user applications generally. All modifications, variations, or equivalent arrangements and implementations that are within the scope of the attached claims should therefore be considered within the scope of the invention.

What is claimed is:

1. A method for managing an online session, the method comprising:

establishing an online session between a plurality of computing devices, each computing device associated with an identifier;

assigning one or more tasks to each of the plurality of computing devices;

maintaining a table stored in database memory, wherein the table tracks the identifier of each computing device in association with the one or more tasks assigned to the computing device;

detecting that one of the computing devices has exited the online session based on a failure to receive a response from the computing device after a pre-determined period, the exited computing device associated with an identifier;

identifying that the exited computing device had been assigned at least one of the tasks based on the identifier of the exited computing device as found in the maintained table; and re-assigning the at least one of the tasks that had been assigned to the exited computing device to another of the plurality of computing devices, wherein the maintained table tracks the re-assigned tasks in association with an identifier of the reassigned computing device, and wherein each of computing devices remaining in the online session share one or more copies of the maintained table.

2. The method of claim 1, wherein re-assigning the at least one of the tasks is based on at least one of network bandwidth capability, processing capability, technical specification, resource availability, or geographic location of the re-assigned computing device.

3. The method of claim 1, further comprising giving a priority to the reassigned computing device based on at least one of network bandwidth capability, processing capability, and location.

4. The method of claim 3, wherein the reassigned computing device is given the priority based on having at least one of largest bandwidth capability relative to other remaining computing devices, highest processing capability relative to the other remaining computing devices, most highly suited technical specifications, highest resource availability, and a location nearest a centralized physical location relative to physical locations of the other remaining computing devices.

5. The method of claim 1, wherein re-assigning the at least one of the tasks is based on user-specified preferences respectively associated with each of the computing devices remaining in the session.

6. The method of claim 5, wherein the user-specified preferences include desire to be assigned a specified task or desire for another computing device to be assigned the specified task.

7. The method of claim 1, wherein the maintained table further tracks at least one of scores from an online game, time of a gaming session, location of items in the online game, and location of a participant in the online game.

8. The method of claim 1, wherein the reassigned task includes filtering a communication message.

9. The method of claim 1, further comprising assigning the respective identifier to each of the computing devices in the online session.

10. The method of claim 1, wherein the assigned tasks include application-specific functions, and wherein the application-specific functions are specific to a type of application.

11. The method of claim 1, further comprising broadcasting a notification to the remaining computing devices upon detection that the exited computing device has exited the online session.

12. The method of claim 1, further comprising broadcasting a request regarding reassignment of the tasks assigned to the exited computing device.

13. The method of claim 1, wherein re-assigning the at least one of the tasks is random.

14. The method of claim 1, wherein re-assigning the at least one of the tasks is based on order of identifiers in the maintained table.

15. The method of claim 1, further comprising sending an invitation to at least one computing device that is not in the online session.

16. The method of claim 15, further comprising maintaining a list of computing devices not in the online session, wherein the invited computing device is selected from the list.

17. The method of claim 15, further comprising pausing the online session until the invited computing device has joined.

18. A non-transitory computer-readable storage medium, having embodied thereon a program executable by a processor to perform a method for managing an online session, the method comprising:

establishing an online session between a plurality of computing devices, each computing device associated with an identifier;

assigning one or more tasks to each of the plurality of computing devices;

maintaining a table stored in database memory, wherein the table tracks the identifier of each computing device in association with the one or more tasks assigned to the computing device;

detecting that one of the computing devices has exited the online session based on a failure to receive a response from the computing device after a pre-determined period, the exited computing device associated with an identifier;

identifying that the exited computing device had been assigned at least one of the tasks based on the identifier of the exited computing device as found in the maintained table; and re-assigning the at least one of the tasks that had been assigned to the exited computing device to another of the plurality of computing devices, wherein the maintained table tracks the re-assigned tasks in association with an identifier of the reassigned computing device, and wherein each of computing devices remaining in the online session share one or more copies of the maintained table.

* * * * *